(12) United States Patent
Anthony et al.

(10) Patent No.: US 7,614,352 B2
(45) Date of Patent: Nov. 10, 2009

(54) IN-SITU CAPTURE OF CARBON DIOXIDE AND SULPHUR DIOXIDE IN A FLUIDIZED BED COMBUSTOR

(75) Inventors: Edward John Anthony, Ottawa (CA); J. Carlos Abanades, Zarazoga (ES)

(73) Assignee: Her Majesty the Queen in right of Canada, as represented by the Minister of Natural Resources, Ottawa, Ontario (CA)

( * ) Notice: Subject to any disclaimer, the term of this patent is extended or adjusted under 35 U.S.C. 154(b) by 158 days.

(21) Appl. No.: 10/554,675

(22) PCT Filed: Apr. 29, 2003

(86) PCT No.: PCT/CA03/00616

§ 371 (c)(1),
(2), (4) Date: Oct. 10, 2006

(87) PCT Pub. No.: WO2004/097297

PCT Pub. Date: Nov. 11, 2004

(65) Prior Publication Data

US 2007/0056487 A1    Mar. 15, 2007

(51) Int. Cl.
*C01F 11/18* (2006.01)
(52) U.S. Cl. .................. 110/344; 110/245; 110/234; 110/349; 110/101 R; 110/101 CF; 423/432
(58) Field of Classification Search .............. 110/344, 110/234, 347, 245, 101 R, 101 CF; 423/638
See application file for complete search history.

(56) References Cited

U.S. PATENT DOCUMENTS

| 3,807,090 A | 4/1974 | Moss |
| 4,015,977 A * | 4/1977 | Crawford ............... 75/325 |
| 4,197,285 A | 4/1980 | Yang et al. |
| 4,411,879 A * | 10/1983 | Ehrlich et al. ........... 423/640 |
| 4,738,207 A * | 4/1988 | Moss ..................... 110/347 |
| 5,662,051 A | 9/1997 | Morin |
| 2007/0092427 A1 * | 4/2007 | Anthony et al. ......... 423/432 |

FOREIGN PATENT DOCUMENTS

| IT | EP0118770 | * | 9/1984 |
| IT | EP118770 A1 | * | 9/1984 |
| WO | WO 94/21965 A1 | | 9/1994 |
| WO | WO9421965 | * | 9/1994 |

OTHER PUBLICATIONS

International Search Report mailed Dec. 23, 2003 in PCT/CA2003/000616 (3 pages).

* cited by examiner

Primary Examiner—Steven B McAllister
Assistant Examiner—Nikhil Mashruwala
(74) Attorney, Agent, or Firm—Flynn, Thiel, Boutell & Tanis, P.C.

(57) ABSTRACT

Both a process and an apparatus whereby a fuel with both a high carbon content, a relatively high sulphur content and a relatively low ash content, can be combusted without the release of potentially damaged amounts of carbon dioxide and sulphur dioxide are described. Further, the process and apparatus each provide an operation whereby the carbon dioxide and sulphur dioxide emissions form the combustion of a carbonaceous fuel with both a high carbon content and a relatively high sulphur content can each be recovered as a useable product. Typically the fuel is petroleum coke, or certain grades of anthracite, coal and natural gas.

17 Claims, 1 Drawing Sheet

Figure 1:
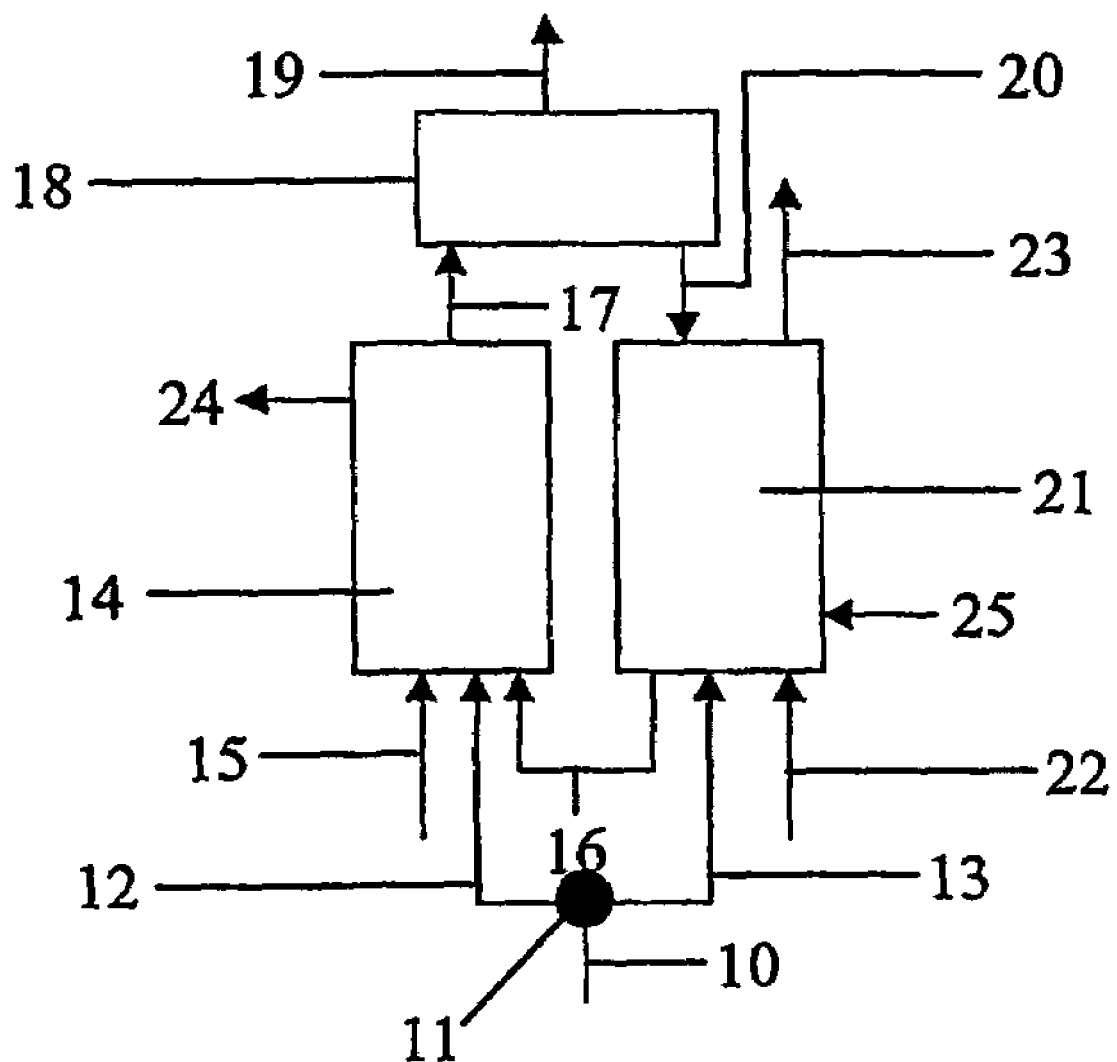

IN-SITU CAPTURE OF CARBON DIOXIDE AND SULPHUR DIOXIDE IN A FLUIDIZED BED COMBUSTOR

This invention relates to an apparatus and a process for capturing and recovering carbon dioxide and sulphur dioxide from combustion gases resulting from the combustion of high carbon content low ash fuels such as petroleum coke, natural gas and anthracite. More particularly, this invention is concerned with capturing both carbon dioxide and sulphur dioxide from the combustion of petroleum coke.

Petroleum coke is a by-product of the oil refining industry. Although it has a high carbon content, as a fuel it shares some undesirable properties with some coal and anthracite deposits, which include a relatively high sulphur content, and a low volatile material content and also with natural gas from some sources which also can have a significant sulphur content. Although petroleum coke is thus unattractive as a fuel, owing to the increasing level of heavy oil processing, the production of petroleum coke is increasing. Similarly a need exists to be able to burn the other high sulphur fossil fuels without causing environmental damage. The high level of availability and a relatively low price make the use of petroleum coke as a fuel increasingly attractive.

There are, however, two environmental problems directly associated with the combustion of petroleum coke, and with the combustion of other high sulphur fossil fuels such as coal, anthracite and natural gas, as a fuel. Due to the high carbon content, a large quantity of carbon dioxide is formed, and similarly due to the sulphur present, significant amounts of sulphur dioxide are also formed. Under normal combustion conditions, these environmentally damaging gases are released at a relatively low concentration in the flue gases which can make it difficult to capture them economically.

In the past it has been proposed to use a calcium compound, such as calcium oxide or calcium carbonate derived from limestone, or a similar mixed calcium/magnesium compound derived from dolomite, to trap both carbon dioxide and sulfur dioxide in various forms of combustion furnaces, including furnaces incorporating fluidized beds. Although these methods are moderately successful, they have several significant disadvantages. First, the efficiency of gas capture by the calcium compound is not high, with the result that the furnace ashes can contain significant amounts of calcium oxide. Second, due to the calcium oxide content, the furnace ashes cannot simply be disposed of in a landfill site without further processing to eliminate the calcium oxide. Third, due to the low efficiency of the gas capture process, the amount of calcium compound required is far higher than the chemistry of the process indicates to be necessary.

This invention seeks to provide both a process and an apparatus whereby a fuel having a high carbon content, a relatively high sulphur content and a relatively low ash content, can be combusted without the release of potentially damaging amounts of carbon dioxide and sulphur dioxide. Further, this invention seeks to provide a process and an apparatus whereby the carbon dioxide and sulphur dioxide obtained from the combustion of a carbonaceous fuel with both a high carbon content and a relatively high sulphur content can each be recovered as a useable product. For example, carbon dioxide can be used in enhanced oil recovery processes and calcium sulphate can be used in the manufacture of building products such as gypsum wall board.

Thus in a first broad aspect, this invention seeks to provide a process for capturing and recovering carbon dioxide and sulphur dioxide from the combustion of a carbonaceous fuel having a high carbon content, and either a low ash content or a low ash content and a relatively high sulphur content, which process comprises:

(a) splitting a flow of carbonaceous fuel having a particle size compatible with combustion in a fluidized bed into a major proportion and a minor proportion;

(b) transferring the major proportion of the fuel to a pressurised fluidised bed combustor and carbonator (PFBC/C);

(c) combusting the major proportion of the fuel flow in the PFBC/C in the presence of air and in the presence of calcium oxide;

(d) recovering a flue gas flow containing solids including calcium carbonate and calcium sulphate from the PFBC/C;

(e) separating the solids from the flue gas flow;

(f) transferring the minor proportion of the fuel to a calciner;

(g) combusting the minor proportion of the flow of fuel in the calciner in the presence of both relatively pure oxygen and the solids flow separated in step (e) to convert the calcium carbonate in the solids flow into calcium oxide and carbon dioxide gas;

(h) recovering a flow of carbon dioxide gas from the calciner;

(i) recovering a flow of solids from the calciner including the calcium oxide generated in the calciner;

(j) transferring the flow of solids obtained in step (i) to the PFBC/C to provide the calcium oxide required in step (c); and (k) recovering calcium sulphate and spent solids from the solids flowing through the PFBC/C and adding fresh calcium carbonate to the calciner to maintain a solids balance within the process.

Preferably, the carbon content of the fuel is less than about 85% by weight. More preferably, the carbon content of the fuel is from 80% to about 85% by weight. Most preferably, the carbon content of the fuel is about 83% by weight.

Preferably, the carbonaceous fuel is a fossil fuel chosen from the group consisting of petroleum coke, coal, anthracite and natural gas. More preferably the fuel is petroleum coke.

Preferably, the sulphur content of the fuel is less than about 10% by weight. More preferably, the sulphur content of the fuel is from about 3% to about 6% by weight. Most preferably, the sulphur content of the fuel is about 4% by weight.

Preferably, the carbonaceous fuel has an ash content of less than about 5%. More preferably, the carbonaceous fuel has an ash content of less than 1%.

Preferably the PFBC/C and the calciner are both operated at the same pressure; Alternatively, the PFBC/C is operated under pressure and the calciner is operated at ambient pressure.

Preferably, the PFBC/C and the calciner are both operated at a pressure of from about 15 bar to about 20 bar. Alternatively, the PFBC/C is operated at a pressure of from about 15 bar to about 20 bar and the calciner is operated at ambient pressure.

In a second embodiment, this invention seeks to provide an apparatus for capturing and recovering carbon dioxide and sulphur dioxide from the combustion of a carbonaceous fuel having a high carbon content, a relatively high sulphur content and a low ash content, which apparatus includes in combination:

(i) a carbonaceous fuel feed line for a flow of carbonaceous fuel of a size suitable for use in a fluidised bed combustor;

(ii) a splitter constructed and arranged to divide the flow of fuel in the fuel feed line into a major proportion and into a minor proportion;
(iii) a combustor fuel feed line constructed and arranged to receive the major proportion of the fuel flow from the splitter;
(iv) a pressurised fluidised bed combustor and carbonator (PFBC/C) constructed and arranged to receive and combust the major proportion of the fuel flow from the combustor fuel feed line;
(v) a compressed air line constructed and arranged to provide combustion air to the PEBC/C;
(vi) a calcium oxide transfer line having a first end and a second end, the first end being constructed and arranged to feed a solids flow including calcium oxide to the PFBC/C;
(vii) a separator feed line constructed and arranged to transfer a flow of flue gas containing entrained solids including calcium carbonate from the PFBC/C to a separator constructed and arranged to separate the flue gas from the entrained solids therein;
(viii) an exhaust flue constructed and arranged to receive the flue gas from the separator;
(ix) a calcium carbonate transfer line constructed and arranged to receive the entrained solids containing calcium carbonate from the separator;
(x) a calciner fuel feed line constructed and arranged to receive the minor proportion of the fuel flow from the splitter;
(xi) a calciner constructed and arranged to receive the minor proportion of the fuel flow in the calciner fuel feed line and calcium carbonate from the calcium carbonate transfer line in step (ix);
(xii) an oxygen feed line constructed and arranged to provide oxygen for combustion to the calciner;
(xiii) a carbon dioxide line constructed and arranged to receive a flow of carbon dioxide from the calciner;
(xiv) the second end of the calcium oxide transfer line being constructed and arranged to receive a solids flow containing calcium oxide from the calciner;
(xv) a means to recover calcium sulphate and spent solids formed in the PFBC/C from the circulating solids; and
(xvi) a means constructed and arranged to add sufficient fresh calcium carbonate to the calciner to maintain the solids balance in the system.

The invention will now be described in one embodiment with reference to FIG. 1 which shows a schematic process diagram for the process of this invention. The remainder of the system will be discussed below.

In FIG. 1, the carbonaceous high sulphur fuel is petroleum coke in a suitable particle size for combustion in a fluidised bed. A typical analysis for such a coke in percentages by weight is as follows:

| | |
|---|---|
| Carbon: | 83% |
| Hydrogen: | 5% |
| Sulphur: | 4% |
| Oxygen: | 3% |
| Water: | 5% |
| Ash | <0.5%. |

The incoming petroleum coke in the coke feed line 10 is fed into a splitter 11. A major proportion of the coke leaves the splitter in the combustor coke feed line 12, and a minor proportion leaves the splitter in the calciner coke feed line 13. The coke in line 12 is fed to the combustor 14, which is a pressurised fluidised bed combustor and carbonator (PFBC/C). Air in compressed air line 15 and calcium oxide in the calcium oxide transfer line 16 are also fed to the PFBC/C 14. Again, the calcium oxide, and the calcium carbonate and calcium sulphate discussed below, are all of a size which is suitable to be fluidised in the bed of solids circulating in the PFBC/C. Flue gas including entrained solid calcium carbonate and calcium sulphate leaves the PFBC/C 14 in the separator feed line 17 and enters the separator 18. Exhaust flue gas leaves the separator 18 in the exhaust flue 19, and the entrained calcium carbonate recovered in the separator 18 is passed through the calcium carbonate transfer line 20 into the calciner 21, to which the minor proportion of the coke is fed in the calciner fuel feed line 13. Additionally, relatively pure oxygen is also fed to the calciner 21 through the oxygen feed line 22. The carbon dioxide formed in the calciner 21 is recovered through the carbon dioxide line 23.

When this apparatus is operating, in addition to the combustion process, two reactions take place in the PFBC/C involving the calcium oxide input in the calcium oxide transfer line 16. These are:

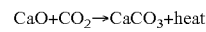
$$CaO + CO_2 \rightarrow CaCO_3 + heat \qquad 1$$

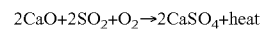
$$2CaO + 2SO_2 + O_2 \rightarrow 2CaSO_4 + heat \qquad 2$$

The pressurised condition in the PFBC/C, typically of the order of from about 15 bar to about 20 bar, enhances absorption by the calcium oxide of both the carbon dioxide and sulphur dioxide.

The calcium carbonate and calcium sulphate both leave with the flue gases in the separator line 17 to the separator 18. In the separator, which is typically a high temperature cyclone, the flue gas and the solids are separated; the flue gas leaves in the exhaust gas flue 19, and the separated solids including the calcium carbonate and calcium sulphate formed in the PFBC/C are passed to the calciner 21 through the calcium carbonate transfer line 20.

In the calciner 21, the minor proportion of the petroleum coke is combusted in an atmosphere of substantially pure oxygen. The combustion reaction generates sufficient heat to calcine the calcium carbonate to calcium oxide, which, together with the calcium sulphate, is returned to the PFBC/C through line 16. The temperature in the calciner should not be high enough to degrade the calcium sulphate to calcium oxide plus sulphur dioxide, or to reduce the activity of the calcium oxide.

As is normal practise, the solids balance within the system including both the PFBC/C and the calciner is maintained by the removal of some of the circulating solids typically at 24, together with provision of a corresponding amount of solids including fresh calcium carbonate typically at 25.

Because the minor proportion of the petroleum coke is combusted in the calciner 21 in relatively pure oxygen, the carbon dioxide leaving the calciner 21 in the carbon dioxide line 23, which is in part derived from the combustion of the coke, and in part derived from the thermal decomposition of the calcium carbonate entering the calciner 21 from the calcium carbonate transfer line 20, is nearly pure carbon dioxide. Due to the sulphur content of the coke, a small proportion of the oxygen feed in line 22 to the calciner 21 is lost as sulphur dioxide; this is however trapped in the calciner 21 as calcium sulphate by reaction (2), thus substantially avoiding contamination of the carbon dioxide leaving the calciner 21 in the carbon dioxide line 23.

There is some flexibility in the weight ratio chosen for the coke splitter 18 to provide the major proportion for the PFBC/C and the minor proportion for the calciner. The ratio is-determined by the chemistry of the various processes, and is chosen so that the heat derived from burning the fuel in the PFBC/C should balance the heat required to calcine the calcium carbonate. It can thus be seen that the ratio will depend to some extent on the analysis of the fuel in use. For the petroleum coke identified above a ratio of about 2:1 appears to be appropriate; a different ratio will likely be required for a fuel with a different analysis.

In the apparatus shown in FIG. 1 the PFBC/C 14 and the calciner 21 operate at substantially the same pressure as this simplifies the equipment needed for feeding coke into the splitter 11, and moving other solids within the apparatus. Typically this pressure will be from about 15 bar to about 20 bar. The system can be altered so that the calciner operates at ambient pressure, which should improve overall efficiency. However, operation of the calciner at ambient pressure has the disadvantage that the pressure in the carbon dioxide line 23 will also be ambient. Whether this lower pressure is acceptable will depend on the end: use contemplated for the carbon dioxide flow.

As described, this process and apparatus is suitable for the combustion not only of petroleum coke, but also other high carbon content low ash fuels which contain appreciable amounts of sulphur. Typical examples include certain grades of coal, certain grades of natural gas, and certain grades of anthracite.

In FIG. 1 only the PFBC/C, the calciner, and their associated mass transfer systems are shown schematically. In practise this unit will be part of a much larger system. Typically the system will include several heat exchangers to maximise thermal efficiency and also one or more devices utilising the heat generated in the two combustion stages. One typical use for this heat is to operate at least one gas turbine to generate electricity. The technology required for these devices is well known and understood.

The invention claimed is:

1. A process for capturing and recovering carbon dioxide and sulphur dioxide from the combustion of a carbonaceous fuel having a high carbon content, a relatively high sulphur content and a low ash content, which process comprises:
   (a) splitting a flow of carbonaceous fuel having a particle size compatible with combustion in a fluidized bed into a major proportion and a minor proportion;
   (b) transferring the major proportion of the fuel to a pressurized fluidized bed combustor and carbonator, PFBC/C;
   (c) combusting the major proportion of the fuel flow in the PFBC/C in the presence of air and in the presence of calcium oxide;
   (d) recovering a flue gas flow containing solids including calcium carbonate and calcium sulphate from the PFBC/C;
   (e) separating the solids from the flue gas flow;
   (f) transferring the minor proportion of the fuel to a calciner;
   (g) combusting the minor proportion of the flow of fuel in the calciner in the presence of both relatively pure oxygen and the solids flow separated in step (e) to convert the calcium carbonate in the solids flow into calcium oxide and carbon dioxide gas;
   (h) discharging a flow of carbon dioxide gas substantially free of contamination
   (i) recovering said flow of carbon dioxide gas substantially free of contamination;
   (j) recovering a flow of solids from the calciner including the calcium oxide generated in the calciner;
   (k) transferring the flow of solids obtained in step (j) to the PFBC/C to provide the calcium oxide required in step (c); and
   (l) recovering calcium sulphate and spent solids from the solids flowing through the PFBC/C and adding fresh calcium carbonate to the calciner to maintain a solids balance within the process.

2. A process according to claim 1 wherein the carbon content of the fuel is less than about 85% by weight.

3. A process according to claim 2 wherein the carbon content of the fuel is from about 80% to about 85% by weight.

4. A process according to claim 3 wherein the carbon content of the fuel is about 83% by weight.

5. A process according to claim 1 wherein the carbonaceous fuel is chosen from the group consisting of petroleum coke, anthracite, coal and natural gas.

6. A process according to claim 5 wherein the carbonaceous fuel is petroleum coke.

7. A process according to claim 1 wherein the carbonaceous fuel has an ash content of less than about 3%.

8. A process according to claim 7 wherein the carbonaceous fuel has an ash content of less than 1% by weight.

9. A process according to claim 1 wherein the PFBC/C and the calciner are both operated at the same pressure.

10. A process according to claim 1 wherein the PFBC/C is operated under pressure and the calciner is operated at ambient pressure.

11. A process according to claim 1 wherein the PFBC/C and the calciner are both operated at a pressure of from about 15 bar to about 20 bar.

12. A process according to claim 1 wherein the PFBC/C is operated at a pressure of from about 15 bar to about 20 bar and the calciner is operated at ambient pressure.

13. A process according to claim 1 wherein the sulphur content of the fuel is less than about 10% by weight.

14. A process according to claim 13 wherein the sulphur content of the fuel is from about 3% to about 6% by weight.

15. A process according to claim 14 wherein the sulphur content of the fuel is about 4% by weight.

16. A process according to claim 1 wherein the weight ratio of fuel in the major and minor proportions is about 2:1.

17. An apparatus for capturing and recovering carbon dioxide and sulphur dioxide from the combustion of a carbonaceous fuel having a high carbon content, a relatively high sulphur content and a low ash content, which apparatus includes in combination:
   (i) a carbonaceous fuel feed line for providing a flow of carbonaceous fuel of a size suitable for use in a fluidized bed combustor;
   (ii) a splitter for dividing the flow of fuel in the fuel feed line into a major proportion and into a minor proportion;
   (iii) a combustor fuel feed line for receiving the major proportion of the fuel flow from the splitter;
   (iv) a pressurized fluidized bed combustor and carbonator for receiving and combusting the major proportion of the fuel flow from the combustor fuel feed line;
   (v) a compressed air line for providing combustion air to the PFBC/C;
   (vi) a calcium oxide transfer line having a first end and a second end, the first end for feeding a solids flow including calcium oxide to the PFBC/C;
   (vii) a separator feed line for transferring a flow of flue gas containing entrained solids including calcium carbonate from the PFBC/C to a separator for separating the flue gas from the entrained solids therein;
   (viii) an exhaust flue for receiving the flue gas from the separator;

(ix) a calcium carbonate transfer line for receiving the entrained solids containing calcium carbonate from the separator;
(x) a calciner fuel feed line for receiving the minor proportion of the fuel flow from the splitter;
(xi) a calciner for receiving the minor proportion of the fuel flow in the calciner fuel feed line and calcium carbonate from the calcium carbonate transfer line in step (ix);
(xii) an oxygen feed line for providing oxygen for combustion to the calciner;
(xiii) a carbon dioxide line for receiving a flow of carbon dioxide substantially without contamination from the calciner;
(xiv) the second end of the calcium oxide transfer line for receiving a solids flow containing calcium oxide from the calciner;
(xv) a means for recovering calcium sulphate and spent solids formed in the PFBC/C from the circulating solids; and
(xvi) a means for adding sufficient fresh calcium carbonate to the calciner to maintain the solids balance in the system.

* * * * *

UNITED STATES PATENT AND TRADEMARK OFFICE
CERTIFICATE OF CORRECTION

PATENT NO. : 7,614,352 B2 Page 1 of 1
APPLICATION NO. : 10/554675
DATED : November 10, 2009
INVENTOR(S) : Anthony et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 474 days.

Signed and Sealed this

Nineteenth Day of October, 2010

David J. Kappos
*Director of the United States Patent and Trademark Office*